US012675123B2

(12) United States Patent
Suenaga et al.

(10) Patent No.: US 12,675,123 B2
(45) Date of Patent: Jul. 7, 2026

(54) ELECTRONICALLY CONTROLLED REGULATOR

(71) Applicant: Nikki Co., Ltd., Kanagawa-ken (JP)

(72) Inventors: Naoya Suenaga, Kanagawa-ken (JP); Yukinori Suematsu, Kanagawa-Ken (JP); Shutaro Aizawa, Kanagawa-ken (JP)

(73) Assignee: Nikki Co., Ltd. (JP)

( * ) Notice: Subject to any disclaimer, the term of this patent is extended or adjusted under 35 U.S.C. 154(b) by 40 days.

(21) Appl. No.: 18/674,803

(22) Filed: May 24, 2024

(65) Prior Publication Data

US 2024/0393813 A1     Nov. 28, 2024

(30) Foreign Application Priority Data

May 26, 2023     (JP) ................................. 2023-087018

(51) Int. Cl.
  *G05D 16/20*         (2006.01)
  *F16K 31/06*         (2006.01)
  (Continued)

(52) U.S. Cl.
  CPC ......... *G05D 16/202* (2013.01); *G05D 16/107* (2019.01); *G05D 16/166* (2013.01); *F16K 31/0655* (2013.01); *Y10T 137/7761* (2015.04)

(58) Field of Classification Search
  CPC ......... Y10T 137/7826; Y10T 137/7825; Y10T 137/7761; G05D 16/202
  See application file for complete search history.

(56) References Cited

U.S. PATENT DOCUMENTS 4,791,954 A * 12/1988 Hasegawa ............ G05D 16/202
                                                          137/489.5
4,915,083 A * 4/1990 Hewette ................. F02M 26/72
                                                          123/568.24
(Continued)

FOREIGN PATENT DOCUMENTS

EP         2602525 A1     6/2013
EP         2602526 A1     6/2013
  (Continued)

OTHER PUBLICATIONS

EESR, EP24176850.6, dated Oct. 9, 2024.

*Primary Examiner* — Robert K Arundale
(74) *Attorney, Agent, or Firm* — Fishman Stewart PLLC

(57)         ABSTRACT

An electronically controlled regulator may include a pressure regulating valve. The pressure regulating valve may include a valve shaft, a valve seat, and a discharge pressure regulating unit. The discharge pressure regulating unit may regulate a pressure of a fluid by causing the valve shaft to reciprocate through driving of an electric motor electronically controlled to change a distance between a valve body and the valve seat. A high-pressure fluid introduced from an introduction port may be discharged from a discharge port as a depressurized fluid at a set pressure on a side of a discharge pressure chamber while being depressurized and regulated. A piston may receive a fluid pressure in the discharge pressure chamber, which pressure may be converted into a pressure load in a direction where the valve body is pressed to the seat face during valve closing when the driving of the electric motor is stopped.

9 Claims, 6 Drawing Sheets

(51) Int. Cl.
      *G05D 16/10*          (2006.01)
      *G05D 16/16*          (2006.01)

(56)                    References Cited

U.S. PATENT DOCUMENTS

| | | | | |
|---|---|---|---|---|
| 4,915,127 | A * | 4/1990 | Werley | G05D 16/0663 |
| | | | | 137/71 |
| 2002/0036013 | A1* | 3/2002 | Inayama | G05D 16/2024 |
| | | | | 137/487.5 |
| 2006/0016492 | A1* | 1/2006 | Muller | F16K 31/0634 |
| | | | | 137/625.26 |
| 2006/0254651 | A1* | 11/2006 | Hodge | G05D 7/0635 |
| | | | | 137/487.5 |
| 2012/0090177 | A1* | 4/2012 | Andueza | F16K 27/029 |
| | | | | 29/890.124 |
| 2013/0167950 | A1* | 7/2013 | Nomichi | F16K 31/0613 |
| | | | | 137/487 |
| 2014/0061520 | A1* | 3/2014 | Groh | G05D 16/202 |
| | | | | 251/129.08 |
| 2015/0059878 | A1* | 3/2015 | Kobayashi | F02M 21/023 |
| | | | | 137/505.14 |
| 2023/0384807 | A1 | 11/2023 | Suenaga | |

FOREIGN PATENT DOCUMENTS

| | | | |
|---|---|---|---|
| JP | S59160842 | U1 | 10/1984 |
| JP | 3594507 | B2 | 12/2004 |
| JP | 2011256759 | A | 12/2011 |
| JP | 2023175563 | A | 12/2023 |

* cited by examiner

ELECTRONICALLY CONTROLLED REGULATOR

CROSS REFERENCE TO RELATED APPLICATIONS

This application claims priority to Japanese Patent Application No. JP 2023-087018, filed on May 26, 2023, the contents of which is hereby incorporated by reference in its entirety.

TECHNICAL FIELD

The present invention relates to a regulator that discharges a high-pressure fluid such as a gas fuel while depressurizing and regulating the fluid to a predetermined pressure, and in particular, to an electronically controlled regulator that regulates a pressure of the fluid to be discharged by electronic control.

BACKGROUND

As a regulator that depressurizes a high-pressure fluid to a predetermined pressure and delivers the depressurized fluid, for example, gas fuel regulators described in JP 3594507 B2 and JP 2011-256759 A have been well known. The regulator includes a valve shaft coaxially disposed with a valve body and a doughnut-shaped seat portion having a seat face which has a center penetrated by a valve hole and is in close contact with the valve body. The regulator has a structure in which, in a case of a high-pressure fluid such as CNG flowing in from an inlet of a body of the regulator, the valve shaft disposed in a reciprocally slidable manner in an axial direction with the valve body in an open state of the valve body is energized by a pressure regulating spring with the valve body pressed down in close contact with the seat face with a predetermined pressure, and a high-pressure gas fuel is discharged while being depressurized and regulated to a predetermined pressure.

However, in such conventional depressurization structure of the regulator, it is necessary to prepare the pressure regulating spring in advance for each specified discharge pressure, since a discharge pressure of the fluid by the regulator mechanically depends on a load of the pressure regulating spring. Further, for a regulator used in a fuel supply system of a vehicle, since the pressure regulating spring is fixed to a specified set height in advance, there is a problem that a discharge pressure range and a flow rate range are mechanically limited because a pressure drop increases in a case where an engine required flow rate is large and the pressure drop decreases in a case where the required flow rate is small.

Meanwhile, JP S59-160842 U has proposed a pressure regulating mechanism including a stepping motor that is pulse-controlled in accordance with an output signal from a pressure sensor disposed in a primary-side diaphragm chamber as an energizing force adjusting unit for adjusting an energizing force of a pressure regulating spring in the primary-side diaphragm chamber in an LPG regulator including the primary-side diaphragm chamber and a secondary-side diaphragm chamber.

As described above, with the pressure regulating mechanism including the stepping motor electronically controlled, it is possible to maintain a pressure in the primary-side diaphragm chamber at a desired pressure, by weaken the energizing force of the pressure regulating spring in a case where the pressure in the primary-side diaphragm chamber becomes higher than a preset pressure, and strengthen the energizing force of the pressure regulating spring in a case where the pressure in the primary-side diaphragm chamber becomes lower than the preset pressure.

However, only an inner portion of the primary-side diaphragm chamber can be adjusted and maintained to a desired pressure by the regulator, and a pressure of a fuel discharged from the secondary-side diaphragm chamber depends on the pressure regulating spring arranged in the chamber. Therefore, it is still difficult to set various discharge pressures by one type of regulator, and the problem that the discharge pressure range and the flow rate range are mechanically limited has not been solved.

Therefore, the inventors and applicants of the present application have previously proposed a regulator by electronic control of an electric motor as shown in FIG. 6 in Japanese Patent Application No. 2022-088066. An electronically controlled regulator 1C includes, inside a columnar body 10C, a high-pressure fluid chamber 2C including from an introduction port of a fluid introduction path 11 for introducing a high-pressure fluid to a valve portion of a pressure regulating valve 20C, a discharge pressure chamber 3C including from the valve portion to a discharge port of a fluid delivery path 12 for discharging a depressurized fluid, and a pressure regulating portion 4C as a discharge pressure regulating unit for depressurizing and regulating a pressure of the fluid to be discharged while operating the pressure regulating valve 20C to a predetermined pressure.

Then, the discharge pressure regulating unit constitutes a valve shaft moving structure that moves a valve shaft 21C having a distal end side disposed with a spring 25 while operating by driving an electric motor 30 to change a distance between a valve body 22 and a valve seat 23, and opens and closes the pressure regulating valve 20C to maintain a pressure of the depressurized fluid to a set pressure while operating the valve shaft moving structure by the electric motor 30 based on a value of a pressure sensor for detecting the pressure of the depressurized fluid.

As described above, by adopt a manner to maintain a set discharge pressure through an opening and closing operation of the valve body 22 disposed with the valve shaft 21C while driving and controlling the electric motor 30 based on a discharge pressure detected by the sensor without regulating the discharge pressure only by the spring 25 disposed on the distal end side of the valve shaft 21C, various set discharge pressures can be automatically maintained while flexibly responding to fluctuation of the required flow rate.

However, in such electronically controlled regulator 1C, during valve closing when energization of the electric motor 30 is stopped such as when an engine is stopped, a load for operating the valve body 22 in a closing direction becomes only the energizing force of the spring 25 disposed on the valve shaft 21C, and a pressing force to the seat face 24 of the valve seat 23 is reduced. Therefore, there is a problem that slow leakage is likely to occur from that portion. Further, in a case where a relationship of an outer peripheral seal diameter (Dp) of the valve shaft 21C being smaller than a seat diameter (Ds) of the valve seat 23 is satisfied, if the slow leakage occurs on the discharge pressure chamber 3C side via the pressure regulating valve 20C, the load acting in a valve opening direction increases, and the fluid is more likely to leak.

SUMMARY

The present invention is to solve the above problems, and an object of the present invention is to enable an electronically controlled regulator to prevent occurrence of slow leakage via a pressure regulating valve even in a valve closed state where power supply to an electric motor is stopped.

Therefore, the present invention provides an electronically controlled regulator, the electronically controlled regulator including, inside a body of the regulator formed with an introduction port and a discharge port, a pressure regulating valve including: a valve shaft that is coaxially disposed with a valve body and is able to reciprocate in an axial direction; a valve seat having a seat face capable of being in close contact with the valve body on a side of a high-pressure fluid chamber following the introduction port; and a discharge pressure regulating unit that regulates a pressure of a fluid by causing the valve shaft to reciprocate through driving of an electric motor electronically controlled to change a distance between the valve body and the valve seat, a high-pressure fluid introduced from the introduction port into the high-pressure fluid chamber being discharged from the discharge port as a depressurized fluid at a set pressure on a side of a discharge pressure chamber while being depressurized and regulated by the pressure regulating valve, in which a cylindrical space is formed on the side of the discharge pressure chamber, a piston receiving a fluid pressure in the discharge pressure chamber is slidably arranged in the space together with the valve shaft in a state where the piston is fixed to an outer peripheral side of the valve shaft, and the fluid pressure received by the piston is converted into a pressure load in a direction where the valve body is pressed to the seat face during valve closing when the driving of the electric motor is stopped.

As described above, since the piston receiving the discharge pressure is disposed on the valve shaft and the fluid pressure on the discharge pressure chamber side is converted into a pressure load in a valve closing direction, it is possible to exhibit a self-seal function while generating a load for operating the pressure regulating valve in the valve closing direction by the pressure on the discharge pressure chamber side, and prevent occurrence of slow leakage via the pressure regulating valve, even during the valve closing when the electric motor is stopped.

Further, in the electronically controlled regulator, in a case where an outer peripheral seal diameter of the piston is larger than a seat diameter of the valve seat, and a pressure load obtained by subtracting a pressure receiving area defined by the seat diameter from a pressure receiving area defined by the outer peripheral seal diameter acts as a pressure load in a direction where the valve body is pressed to the seat face, the pressure load for causing the pressure regulating valve to operate in the valve closing direction increases only to an extent that the outer peripheral seal diameter of the piston is larger than the seat diameter of the valve seat. Therefore, the occurrence of the slow leakage can be more easily prevented.

Moreover, in the electronically controlled regulator described above, in a case where the piston is integrated with the valve shaft through adhesion or welding on an inner peripheral side of the piston, a seal member on the piston inner diameter side becomes unnecessary, and thus the number of parts of the product can be reduced.

Alternatively, in a case where the piston is disposed separately from the valve shaft, a degree of freedom in a manufacturing process increases.

According to the present invention in which the piston is disposed on the valve shaft to convert the fluid pressure on the discharge pressure chamber side into the pressure load in the valve closing direction, it is possible to prevent the occurrence of the slow leakage via the pressure regulating valve even during the valve closing when the power supply to the electric motor is stopped.

DETAILED DESCRIPTION

Hereinafter, the embodiments of the present invention will be described with reference to the drawings.

Figure 1:
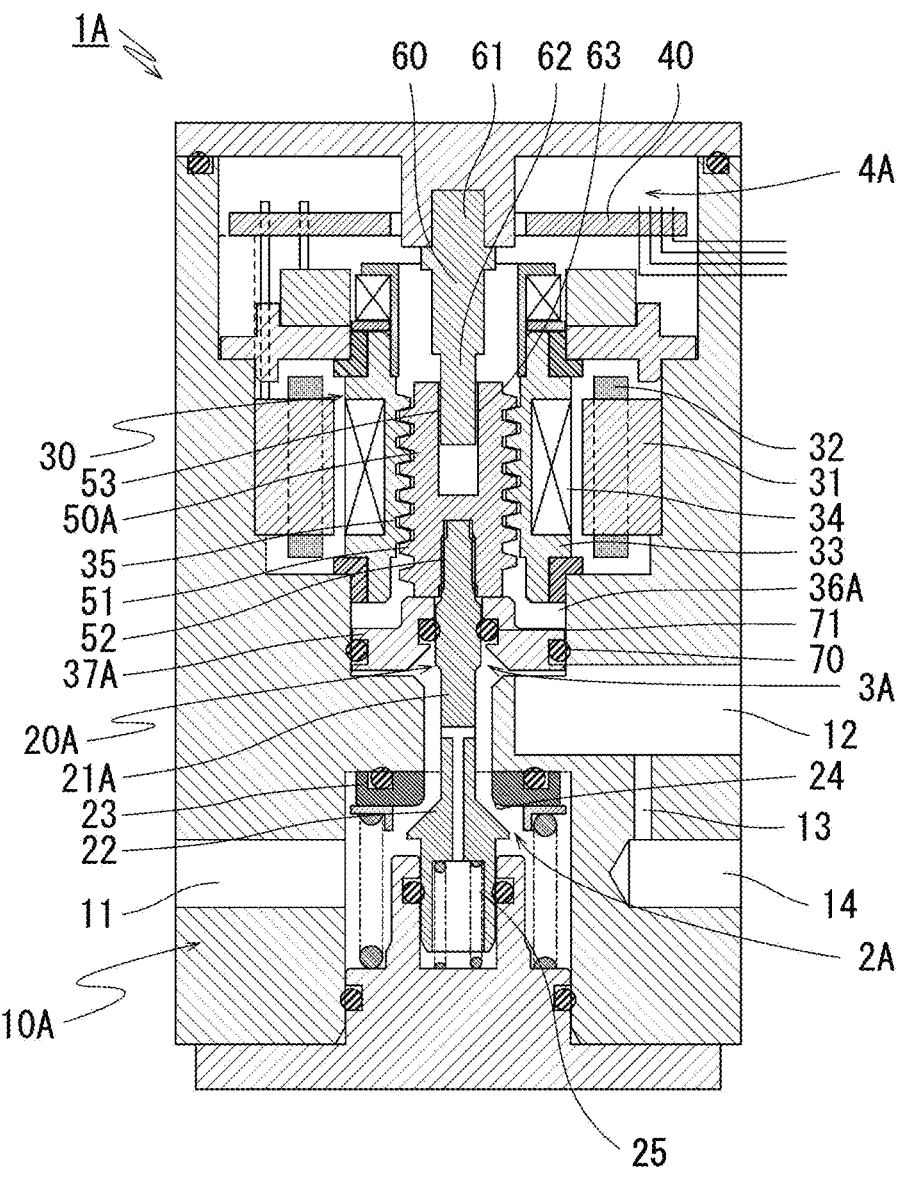
FIG. 1 is a longitudinal sectional view showing a valve opened state of an electronically controlled regulator according to a first embodiment of the present invention.
Figure 2:
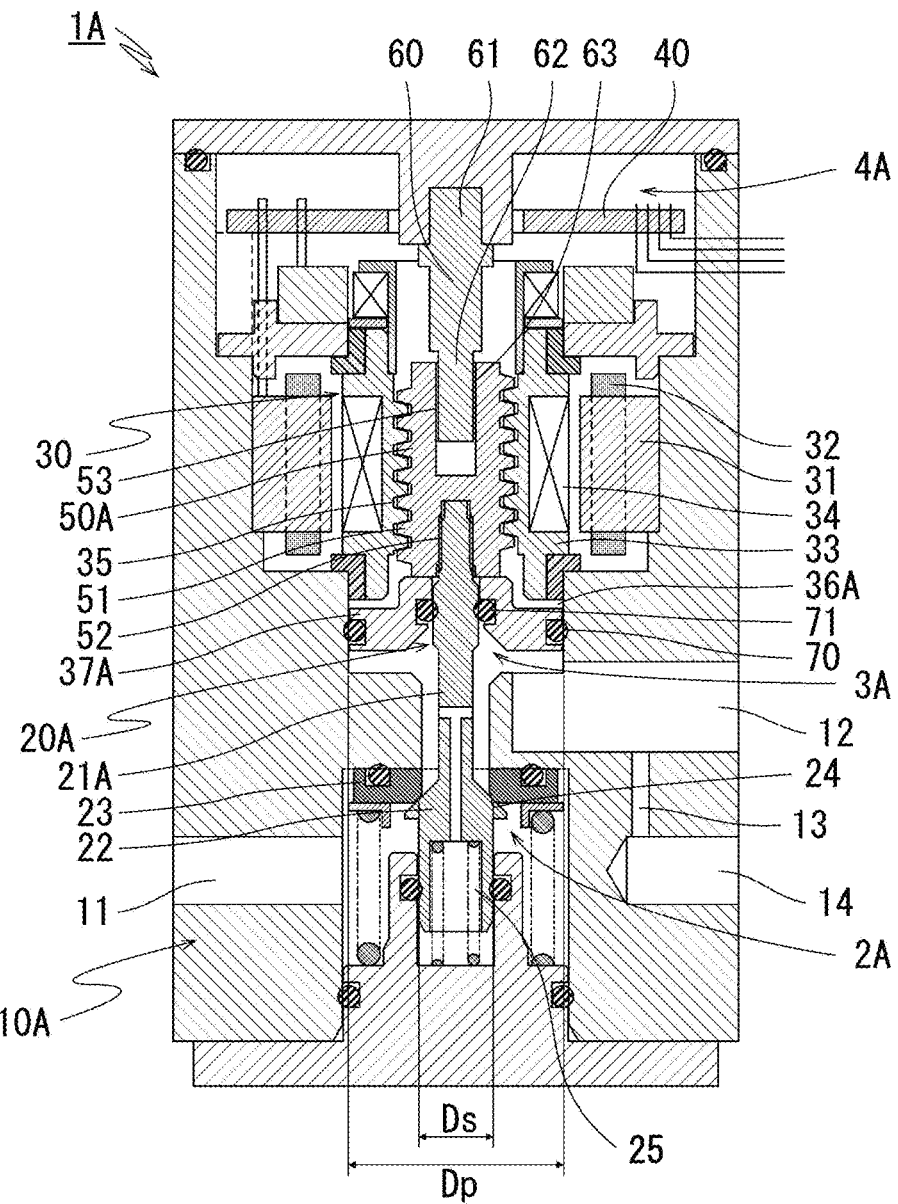
FIG. 2 is a longitudinal sectional view showing a valve closed state of the electronically controlled regulator of FIG. 1.

FIG. 1 shows a valve opened state of an electronically controlled regulator 1A according to the first embodiment of the present invention, and FIG. 2 shows a valve closed state. The electronically controlled regulator 1A is assumed to be used as a depressurizing unit that delivers a gas fuel which is a high-pressure fluid, while depressurizing the gas fuel to a predetermined pressure mainly in a supply system for the gas fuel or the like.

A configuration of the regulator will be roughly described. Inside a body 10A made of metal and formed in a columnar shape, the regulator includes a pressure controller 4A, the pressure controller including a high-pressure fluid chamber 2A constituting a high-pressure portion from an introduction port of a fluid introduction path 11 for introducing a high-pressure fluid to a valve portion of a pressure regulating valve 20A; a discharge pressure chamber 3A constituting a discharge pressure portion from a valve portion of the pressure regulating valve 20A to a discharge port of a fluid delivery path 12 for discharging the fluid depressurized and regulated; and a discharge pressure regulating unit for regulating and maintaining a pressure of the fluid to be discharged.

The pressure regulating valve 20A includes: a valve shaft 21A that is coaxially disposed with an umbrella-shaped valve body 22 and can reciprocate in an axial direction; a doughnut-shaped valve seat 23 having a seat face 24 capable of being in close contact with the valve body 22 and having a center through which a valve hole is formed; and a discharge pressure regulating unit that regulates a discharge pressure by causing the valve shaft 21A to reciprocate to change a distance between the valve body 22 and the valve seat 23.

The discharge pressure regulating unit includes a valve shaft moving structure to be described later that is operated through driving of the electric motor 30 to move the valve shaft 21 in the axial direction, and opens and closes the pressure regulating valve 20A to maintain the pressure of the fluid to be discharged at a set pressure while causing the valve shaft moving structure to operate by the electric motor 30 based on a value of a pressure sensor (not shown) that is installed on the fluid delivery path 12 side and detects the pressure of the fluid depressurized. Note that the pressure sensor can be installed at any position in addition to being installed in a pressure sensor installation portion 14 connected in parallel with the fluid delivery path 12 through a communication hole 13.

The electric motor 30 includes a plurality of stators 31 supporting a winding 32 in a wound state, and a substantially cylindrical rotor 33 in which a plurality of magnets 34 are arranged on an outer peripheral side to face each of the stators 31, and is rotatably arranged with a central axis line being the same as that of the valve shaft 21A.

In the electronically controlled regulator 1A, the valve shaft moving structure is a feed screw mechanism including a combination of a trapezoidal male screw 51 formed on an outer peripheral face of a columnar motion shaft 50A disposed on a distal end side of the valve shaft 21A, and a trapezoidal female screw 35 formed on an inner peripheral face of a rotor 33 that is a cylindrical member constituting a part of the electric motor 30 and meshing with the trapezoidal male screw 51, and the trapezoidal female screw 35 integrated with the inner peripheral face side of the rotor 33 rotates around the trapezoidal male screw 51 through the driving of the electric motor 30.

The discharge pressure regulating unit includes the electric motor 30, a driver 40 that drives and controls the electric motor, and a motion shaft 50A that is coaxially connected with the valve shaft 21A by inserting a proximal end side of the valve shaft 21A into a connection hole 52 on a distal end side, and automatically regulates a pressure of a depressurized fluid to be discharged to be equal to a set pressure while causing the valve body 22 of the valve shaft 21A disposed below the motion shaft to reciprocally slide in the axial direction between a valve closing position (FIG. 2) where the valve body 22 and the seat face 24 are in close contact with each other and a valve opening position (FIG. 1) where the valve body and the seat face are separated from each other through the driving of the electric motor 30 that is electronically controlled with respect to the seat face 24 of the valve seat 23 to change an opening area.

The motion shaft 50A has a structure in which an insertion hole 53 having a planar portion formed on the inner peripheral face is formed at an end portion on a side opposite to the connection hole 52, a detent shaft 60 having a planar portion 63 formed on an outer peripheral face of a distal end 62 by fixing a proximal end 61 to the body 10A is slidably inserted into the insertion hole 53 in the axial direction, and the valve shaft 21A connected through the connection hole 52 is moved by restricting a rotation operation in the motion shaft 50A and converting the rotation operation into a linear operation in the axial direction by bringing the planar portions to be in close contact with each other.

As described above, a manner is adopted to regulate and maintain the discharge pressure at a set discharge pressure by performing opening/closing of the valve body 22 disposed on the valve shaft 21A and adjustment of the valve opening position while driving and controlling the electric motor 30 based on data of the discharge pressure detected by the pressure sensor without regulating the discharge pressure only by the spring 25, and it is possible to automatically maintain various set discharge pressures by one product without requiring replacement of the parts while flexibly responding to the fluctuation of the required flow rate.

Then, in the present embodiment, a cylindrical space 36A is formed in a portion located on the distal end side of the motion shaft 50A on the discharge pressure chamber 3A side, and a piston 37A having an outer diameter substantially matched with an inner diameter in the space 36A is arranged in a state of being able to reciprocally slide in the axial direction in the space 36A while airtightly and liquid-tightly sectioning the space side in which the electric motor 30 and the motion shaft 50A are housed and the discharge pressure chamber 3A side continuing from the valve portion of the pressure regulating valve 20A to the discharge port of the fluid delivery path 12 in a state where the piston is coaxially fixed to the outer peripheral side of the valve shaft 21A by sealing the outer peripheral side and the inner peripheral side with O-rings 70 and 71.

In other words, the piston 37A is configured to reciprocally slide in the axial direction in the cylindrical space 36A while receiving the depressurized fluid pressure in the discharge pressure chamber 3A, to cause the valve shaft 21A to reciprocate, and the fluid pressure in the discharge pressure chamber 3A received by the piston 37A is converted into a pressure load in a direction where the valve body 22 is pressed to the seat face 24 in a valve closed state where the driving of the electric motor 30 is stopped as shown in FIG. 2. This aspect is a largest feature of the present invention.

As described above, by adopting a configuration in which the piston 37A receiving the discharge pressure on the discharge pressure chamber 3A side is disposed on the valve shaft 21A and the depressurized fluid pressure is converted into the pressure load in the valve closing direction, the pressure load in the valve closing direction is applied to the energizing force of the spring 25. Therefore, it is possible to prevent the occurrence of the slow leakage via the pressure regulating valve 20A.

Even in a case where the electric motor 30 is stopped from the valve opened state shown in FIG. 1, the piston 37A moves in an upward direction shown in the drawing by the fluid pressure in the discharge pressure chamber 3A, pushes up the motion shaft 50A, and generates a load for operating the valve shaft 21A in the valve closing direction. Therefore, it is possible to exhibit the self-seal function of increasing the pressure for pressing the valve body 22 to the seat face 24.

Note that, during the valve closing when the electric motor 30 of FIG. 2 is stopped, the piston 37A is in contact with a distal end face of the motion shaft 50A meshing with an inner diameter side of the rotor 33 at a central portion protruding on the proximal end side, and the proximal end side of the valve shaft 21A to which the piston 37A is fixed is fixed to the connection hole 52 of the motion shaft 50A. Therefore, it seems difficult for the piston to operate in the axial direction in the state where the driving of the electric motor 30 is stopped. However, a resistance in a rotation direction of the rotor 33 is extremely small, and even in the state where the driving of the electric motor 30 is stopped, the motion shaft 50A moves in the axial direction while the rotor 33 easily rotates with a slight energizing force in the axial direction with respect to the motion shaft 50A. Therefore, there is no concern that operations of the piston 37A and the valve shaft 21A in the valve closing direction are hindered.

Further, in the present embodiment, an outer peripheral seal diameter (Dp) of the piston 37A is larger than a seat diameter (Ds) of the seat face 24 of the valve seat 23, and a pressure load obtained by subtracting a pressure receiving area defined by the seat diameter (Ds) from a pressure receiving area defined by the outer peripheral seal diameter (Dp) acts as the pressure load in the direction where the valve body 22 is pressed to the seat face 24.

In other words, the pressure load for causing the pressure regulating valve 20A to operate in the valve closing direction increases, and the pressure for bringing the valve body 22 to be in close contact with the seat face 24 increases only to an extent that the outer peripheral seal diameter (Dp) of the piston 37A is larger than a seat diameter (Ds) of the valve seat 22. Therefore, a state where the occurrence of the slow leakage is more easily prevented is achieved.

Note that, in the present embodiment, an inner peripheral side of the piston 37A is fixed to a groove portion formed on an outer peripheral face of the valve shaft 21A via the O-ring 71, and the piston 37A and the valve shaft 21A are configured separately. However, the piston and the valve shaft may be integrated by welding or bonding, and in this case, the seal member such as the O-ring 71 becomes unnecessary, leading to a reduction in the number of the parts.

Figure 3:
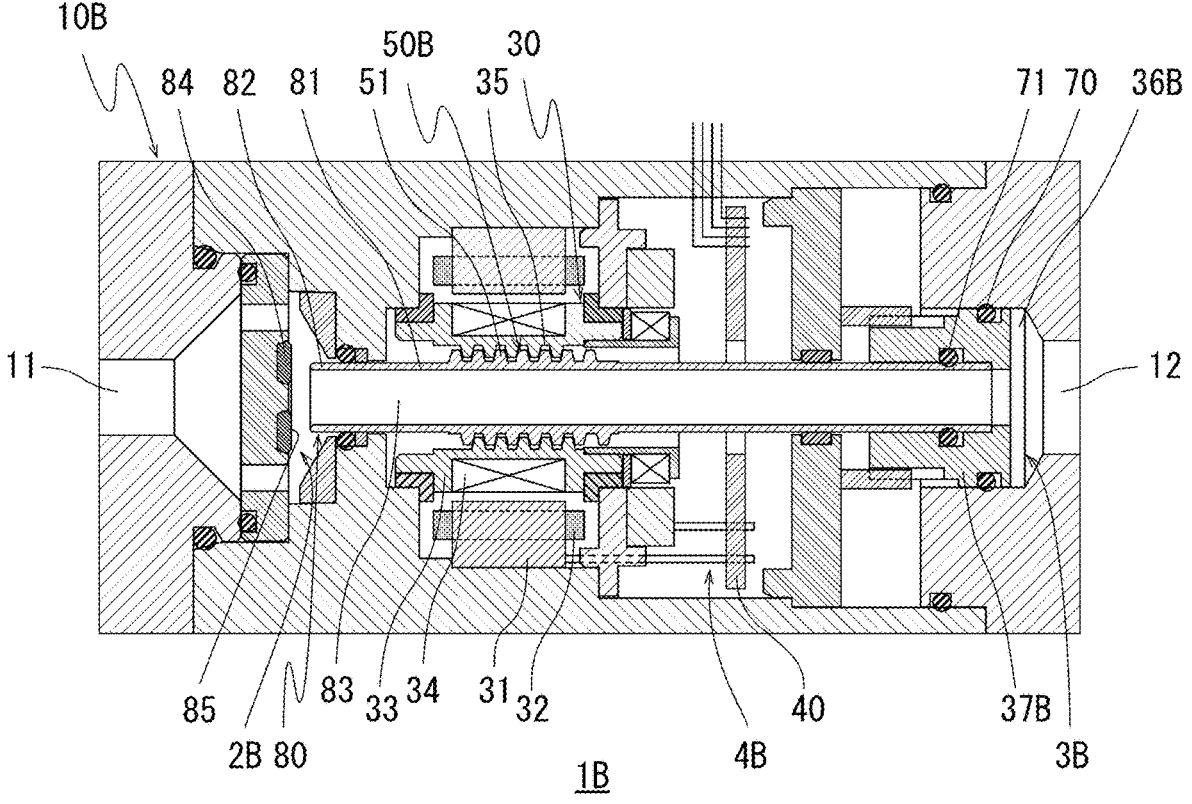
FIG. 3 is a longitudinal sectional view showing a valve opened state of an electronically controlled regulator according to a second embodiment of the present invention.
Figure 4:
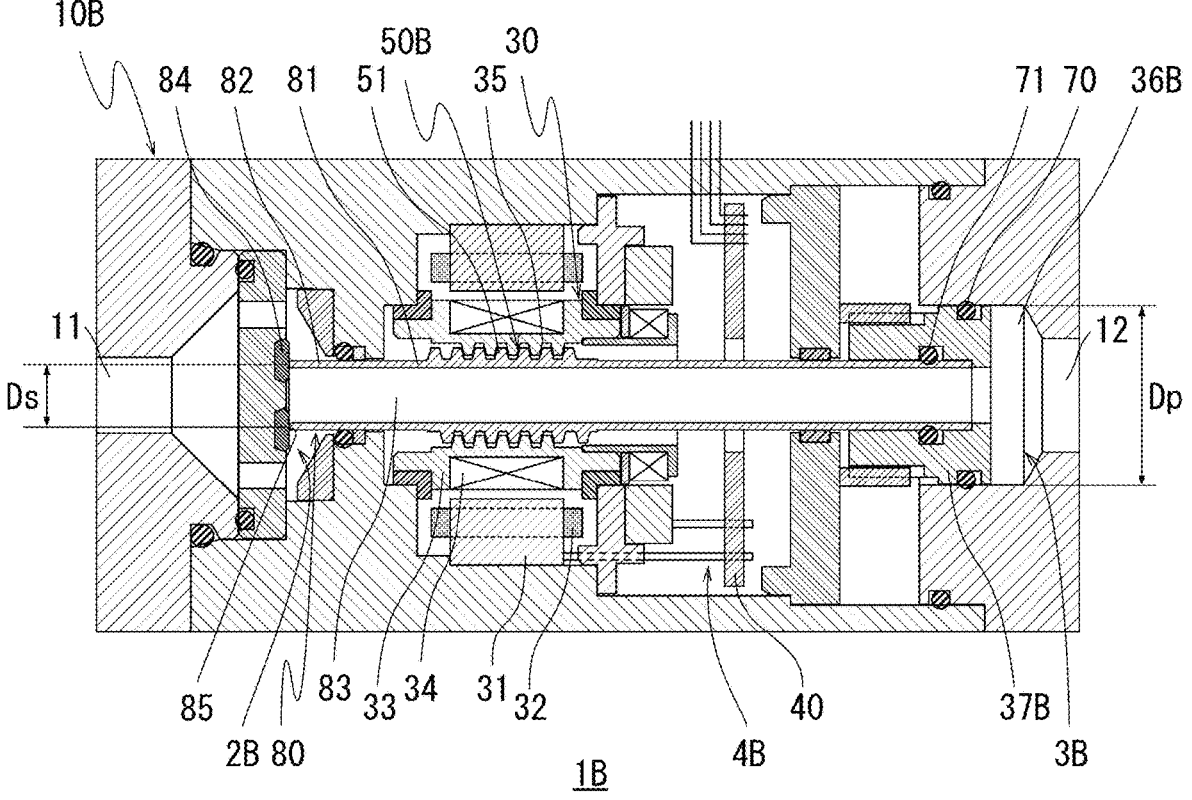
FIG. 4 is a longitudinal sectional view showing a valve closed state of the electronically controlled regulator of FIG. 3.

FIG. 3 shows a state during valve opening of an electronically controlled regulator 1B according to the second embodiment of the present invention is opened, and FIG. 4 shows a state during valve closing thereof. Similarly to the electronically controlled regulator 1A, the electronically controlled regulator 1B is assumed to be used as a depressurizing unit that discharges the gas fuel which is the high-pressure fluid, while depressurizing the gas fuel to the predetermined pressure mainly in the supply system for the gas fuel or the like.

A configuration of the regulator will be roughly described. The regulator is similar to the electronically controlled regulator 1A in that the regulator includes, inside a body 10B made of metal and formed in a columnar shape, a high-pressure fluid chamber 2B constituting a high-pressure portion from the introduction port of the fluid introduction path 11 for introducing the high-pressure fluid to a valve portion of a pressure regulating valve 80; a discharge pressure chamber 3B constituting a discharge pressure portion from the valve portion of the pressure regulating valve 80 to the discharge port of the fluid delivery path 12 for discharging the depressurized fluid; and a pressure controller 4B for reducing and regulating the pressure of the depressurized fluid to be discharged by operating the pressure regulating valve 80 to a set pressure.

The pressure regulating valve 80 includes: a tubular valve shaft 81 that is disposed coaxially with an annular valve body 82, can reciprocate in the axial direction, and has a passage 83 through which the fluid can pass; an annular valve seat 84 having a seat face 85 capable of being in close contact with the valve body 82; and a discharge pressure regulating unit that regulates the discharge pressure of the fluid by causing the valve shaft 81 to reciprocate to change a distance between the valve body 82 and the valve seat 84.

The regulator is similar to the electronically controlled regulator 1A also in that the discharge pressure regulating unit includes the electric motor 30, the driver 40 that drives and controls the electric motor 30, and a motion shaft 50B integrally formed on an outer peripheral side of the valve shaft 81, and regulates the pressure of the depressurized fluid to be discharged to be equal to the set pressure while causing the valve body 82 of the valve shaft 81 disposed through the discharge pressure regulating unit to reciprocate in the axial direction between a valve closing position (FIG. 4) where the valve body 82 and the seat face 85 are in close contact with each other and a valve opening position (FIG. 3) where the valve body and the seat surface are separated from each other through the driving of the electric motor 30 electronically controlled with respect to the seat face 85 of the valve seat 84 to change an opening area.

Then, also in the electronically controlled regulator 1B of the present embodiment, a cylindrical space 36B is formed at a position in front of the fluid delivery path 12 in the discharge pressure chamber 3B on a proximal end side of the valve shaft 81 integrated with the motion shaft 50B, and a piston 37B having an outer diameter substantially matched with an inner diameter in the space 36B is arranged in a state of being able to reciprocally slide in the axial direction in the cylindrical space 33B while airtightly and liquid-tightly sectioning a space side in which the electric motor 30 and the motion shaft 50B are housed and the fluid delivery path 12 side of the discharge pressure chamber 3B in a state where the piston is coaxially fixed to an outer peripheral side of the proximal end portion of the valve shaft 81 in a cylindrical shape by sealing the outer peripheral side and the inner peripheral side with the O-rings 70 and 71.

In other words, the regulator has a configuration in which the piston 37B reciprocally slides in the axial direction in the cylindrical space 36B while receiving the depressurized fluid pressure on the discharge pressure chamber 3B side to cause the valve shaft 81 to reciprocate, and the fluid pressure in the discharge pressure chamber 3B received by the piston 37B is converted into a pressure load in a direction where the valve body 82 is pressed to the seat face 85 during the valve closing when the driving of the electric motor 30 is stopped shown in FIG. 4. This aspect is also common to the electronically controlled regulator 1A, and it is possible to prevent the slow leakage via the pressure regulating valve 80 even during the valve closing when the driving of the electric motor 30 is stopped.

Further, also in the present embodiment, an outer peripheral seal diameter (Dp) of the piston 37B is larger than a seat diameter (Ds) of the seat face 85 of the valve seat 84, and a pressure load obtained by subtracting a pressure receiving area defined by the seat diameter (Ds) from a pressure receiving area defined by the outer peripheral seal diameter (Dp) acts as a pressure load in a direction where the valve body 82 is pressed to the seat face 85, as shown in FIG. 4.

Therefore, since the pressure load for causing the pressure regulating valve 80 to operate in the valve closing direction increases only to an extent that the outer peripheral seal diameter (Dp) of the piston 37B is larger than the seat diameter (Ds) of the valve seat 82, the state where the occurrence of the slow leakage is more easily prevented is achieved.

Figure 5:
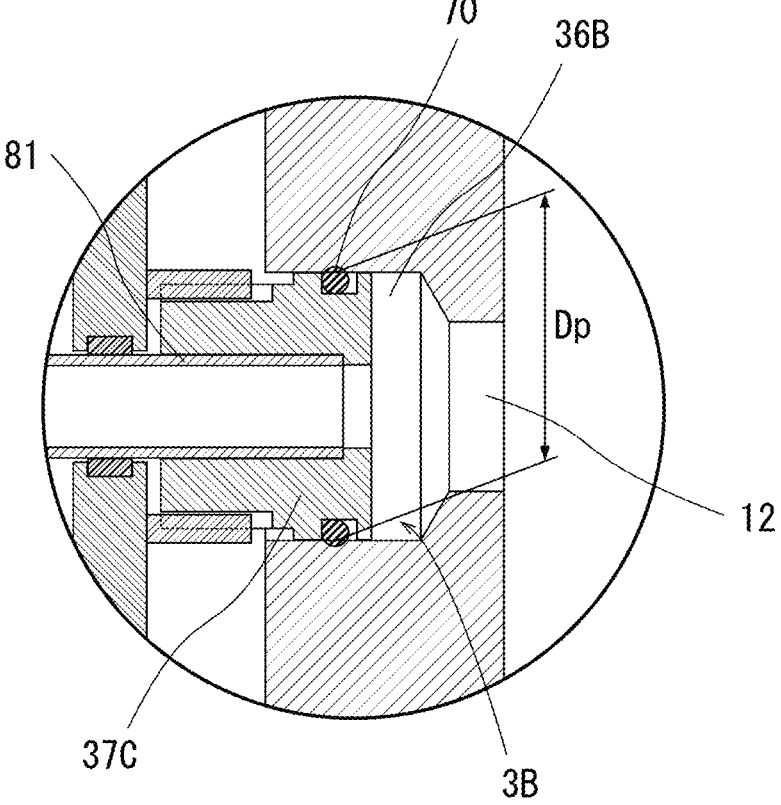
FIG. 5 is an enlarged longitudinal sectional partial view showing different structures of a piston and a valve shaft in the electronically controlled regulator of FIG. 4.
Figure 6:
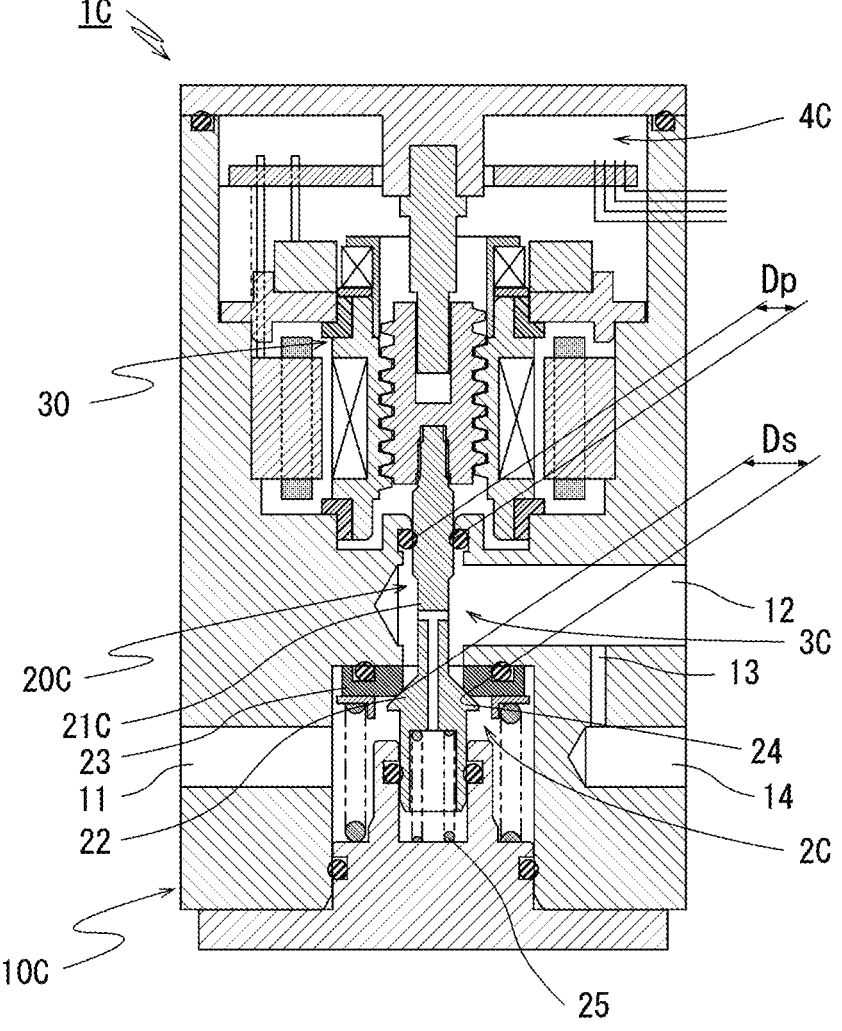
FIG. 6 is a longitudinal sectional view showing an electronically controlled regulator previously filed by the applicants.

Note that, as shown in the enlarged longitudinal sectional partial view of FIG. 5, the valve shaft 81 and the piston 37C may be integrated by fixing the proximal end side of the valve shaft 81 to an inner peripheral face of a through hole of the piston 37C through laser welding or the like in a state of being inserted into the through hole. Accordingly, the seal member such as the O-ring 71 at an insertion portion of the valve shaft 81 becomes unnecessary, and thus the number of the parts can be reduced.

As described above, according to the present invention, with the electronically controlled regulator, it is possible to prevent the occurrence of the slow leakage via the pressure regulating valve even in the valve closed state where the power supply to the electric motor is stopped.

What is claimed is:

1. An electronically controlled regulator, comprising:
   a body formed with an introduction port and a discharge port;
   a pressure regulating valve disposed inside the body;
   an electric motor disposed inside the body;

a pressure sensor detecting a value of a discharge pressure;

a driver that drives and controls the electric motor based on the value of the discharge pressure;

the pressure regulating valve including:

a valve shaft that is coaxially disposed with a valve body and is able to reciprocate in an axial direction;

a valve seat having a seat face capable of being in close contact with the valve body on a side of a high-pressure fluid chamber following the introduction port; and a discharge pressure regulating unit that regulates a pressure of a fluid by causing the valve shaft to reciprocate through driving of the electric motor electronically controlled to change a distance between the valve body and the valve seat, a high-pressure fluid introduced from the introduction port into the high-pressure fluid chamber being discharged from the discharge port as a depressurized fluid at a set pressure on a side of a discharge pressure chamber while being depressurized and regulated by the pressure regulating valve;

a valve shaft moving structure configured as a feed screw mechanism including:

a trapezoidal male screw formed on an outer peripheral face of a columnar motion shaft disposed on a distal end side of the valve shaft; and a trapezoidal female screw formed on an inner peripheral face of a rotor that is a cylindrical member constituting a part of the electric motor and meshing with the trapezoidal male screw, the trapezoidal female screw integrated with the inner peripheral face side of the rotor and rotatable around the trapezoidal male screw via the electric motor;

wherein a cylindrical space is formed on the side of the discharge pressure chamber;

wherein a piston receiving a fluid pressure in the discharge pressure chamber is slidably arranged in the cylindrical space together with the valve shaft in a state where the piston is fixed to an outer peripheral side of the valve shaft; and wherein the fluid pressure received by the piston is converted into a pressure load in a direction where the valve body is pressed to the seat face during valve closing when the driving of the electric motor is stopped.

2. The electronically controlled regulator according to claim 1, wherein:

an outer peripheral seal diameter of the piston is larger than a seat diameter of the valve seat; and a pressure load obtained by subtracting a pressure receiving area defined by the seat diameter from a pressure receiving area defined by the outer peripheral seal diameter acts as the pressure load in the direction where the valve body is pressed to the seat face.

3. The electronically controlled regulator according to claim 1, wherein the piston is integrated with the valve shaft on an inner peripheral side of the piston via at least one of adhesion and welding.

4. The electronically controlled regulator according to claim 1, wherein the piston is disposed separately from the valve shaft.

5. The electronically controlled regulator according to claim 2, wherein the piston is integrated with the valve shaft on an inner peripheral side of the piston via at least one of adhesion and welding.

6. The electronically controlled regulator according to claim 2, wherein the piston is disposed separately from the valve shaft.

7. An electronically controlled regulator, comprising:

a body formed with an introduction port and a discharge port;

a pressure regulating valve disposed inside the body;

an electric motor disposed inside the body;

the pressure regulating valve including:

a valve shaft that is coaxially disposed with a valve body and is able to reciprocate in an axial direction;

a valve seat having a seat face capable of being in close contact with the valve body on a side of a high-pressure fluid chamber following the introduction port; and a discharge pressure regulating unit that regulates a pressure of a fluid by causing the valve shaft to reciprocate through driving of the electric motor electronically controlled to change a distance between the valve body and the valve seat, a high-pressure fluid introduced from the introduction port into the high-pressure fluid chamber being discharged from the discharge port as a depressurized fluid at a set pressure on a side of a discharge pressure chamber while being depressurized and regulated by the pressure regulating valve;

a valve shaft moving structure coupled to the electric motor and to the valve shaft, the valve shaft moving structure configured to convert rotary motion provided by the electric motor into linear motion of the valve shaft;

wherein a cylindrical space is formed on the side of the discharge pressure chamber;

wherein a piston receiving a fluid pressure in the discharge pressure chamber is slidably arranged in the cylindrical space together with the valve shaft in a state where the piston is fixed to an outer peripheral side of the valve shaft; and wherein the fluid pressure received by the piston is converted into a pressure load in a direction where the valve body is pressed to the seat face during valve closing when the driving of the electric motor is stopped.

8. The electronically controlled regulator according to claim 7, wherein the valve shaft moving structure is a feed screw mechanism.

9. The electronically controlled regulator according to claim 8, wherein the feed screw mechanism includes:

a female screw portion coupled to a rotor of the electric motor, the female screw portion rotatable via the electric motor; and a male screw portion coupled to the valve shaft, the male screw portion engaged with the female screw portion such that rotation of the female screw portion linearly moves the valve shaft and the valve body with respect to the valve seat.

* * * * *